Sept. 24, 1968  R. C. RICHMOND ET AL  3,402,729
CONSISTOMETER
Filed Aug. 4, 1967  7 Sheets-Sheet 6

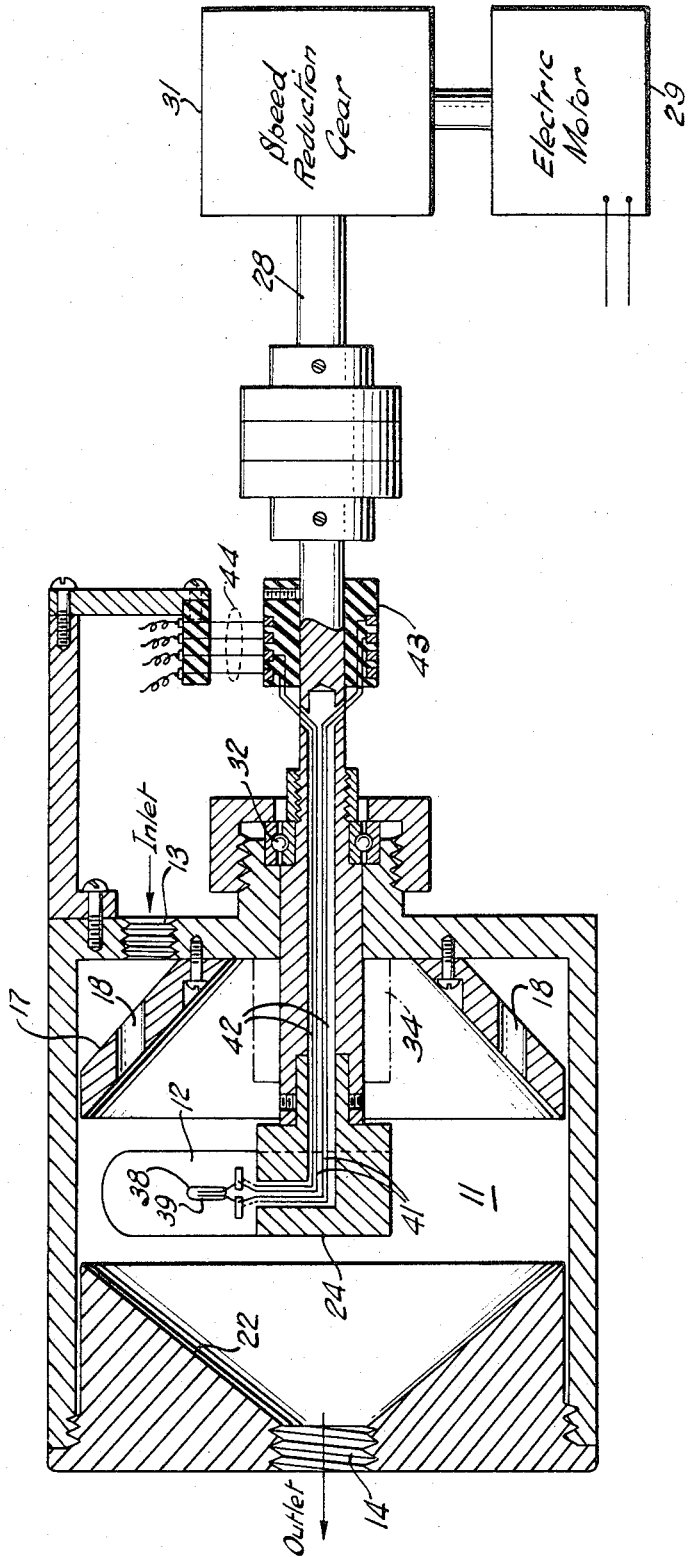

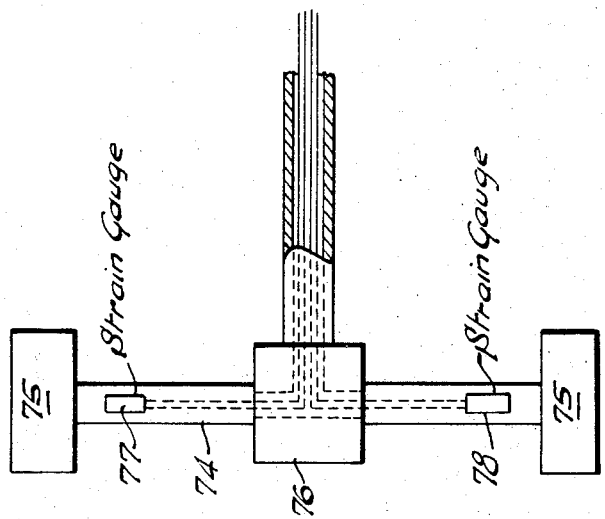
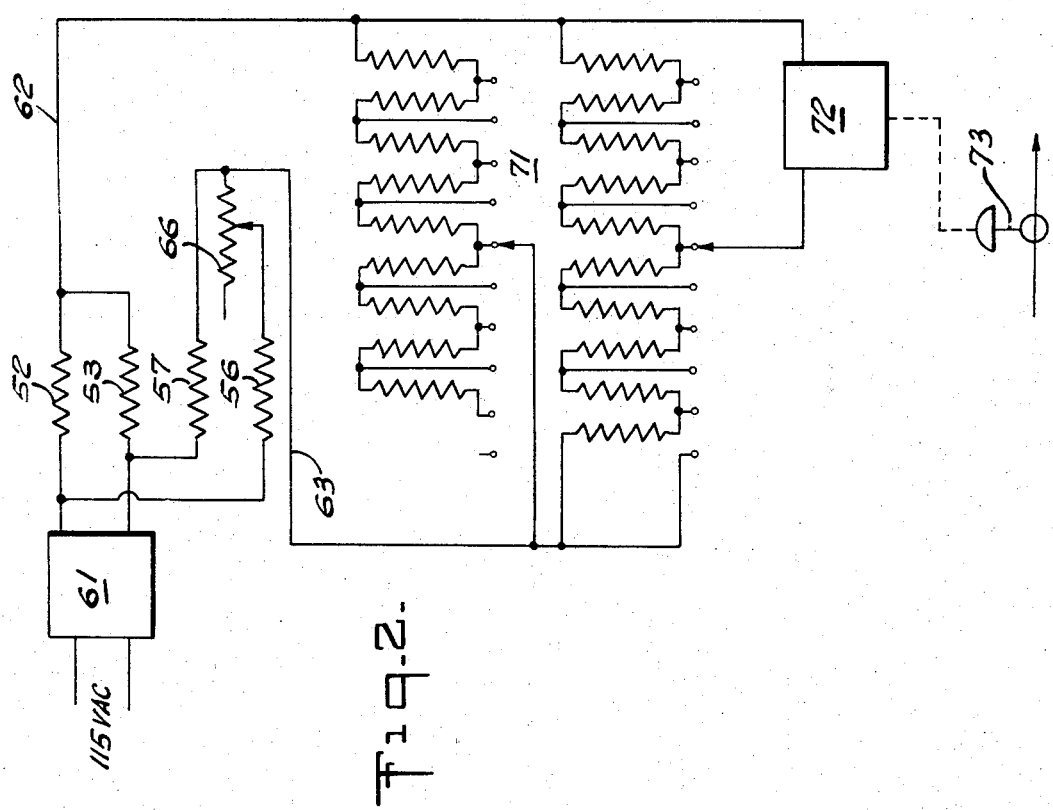

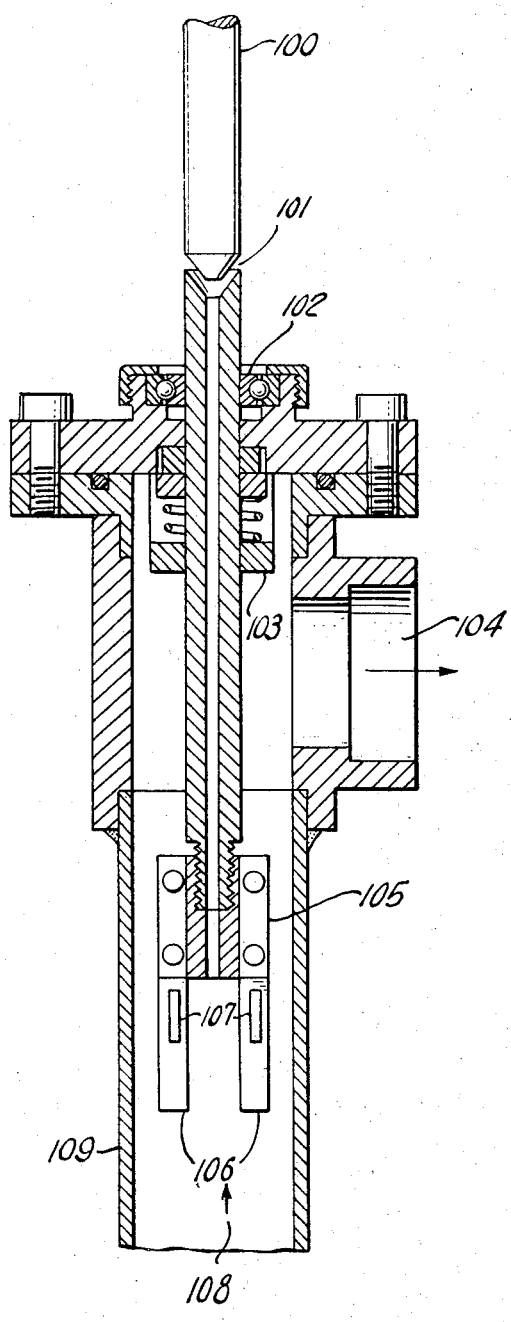

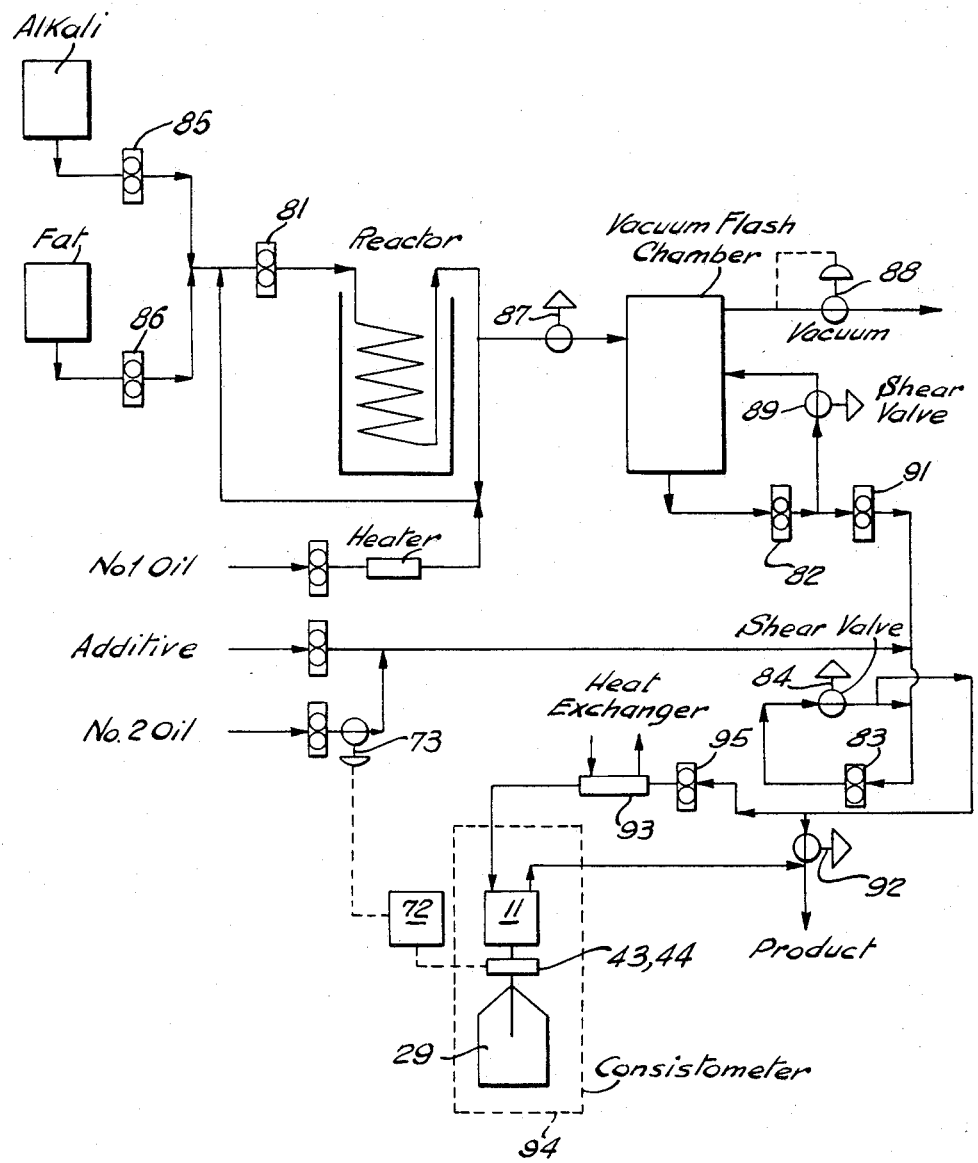

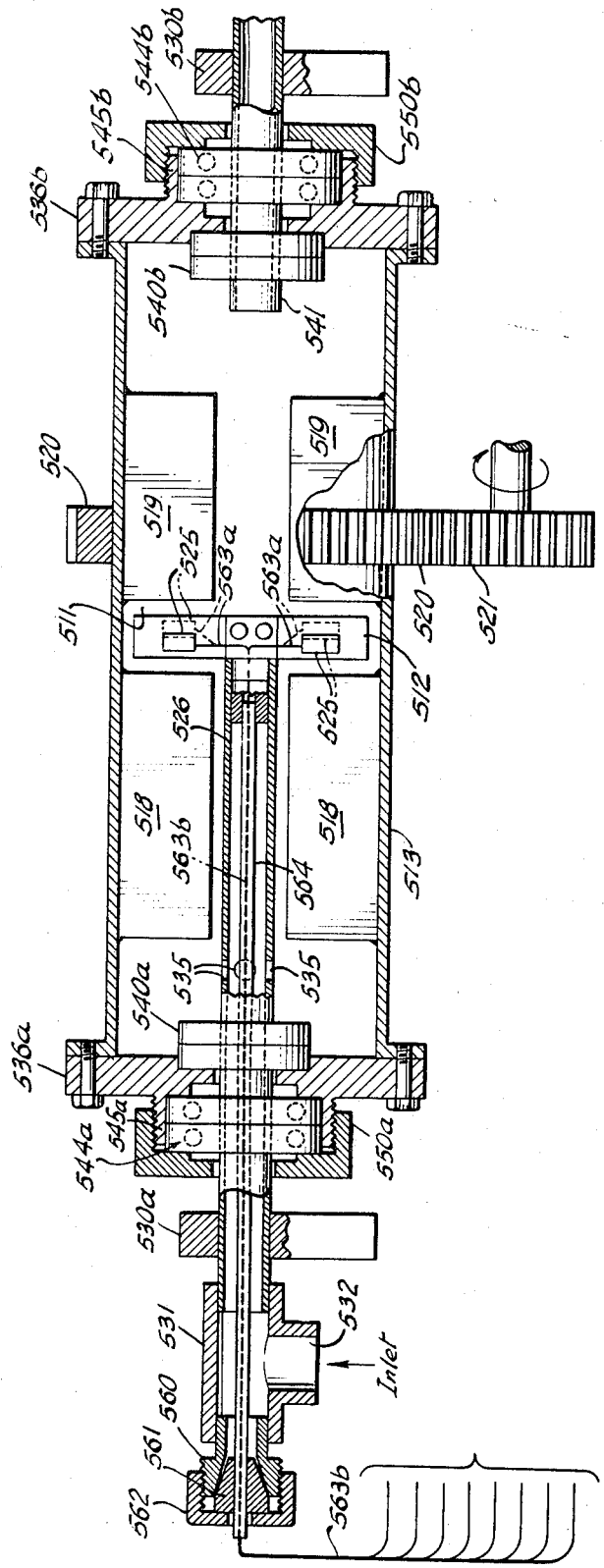

United States Patent Office 3,402,729
Patented Sept. 24, 1968

3,402,729
CONSISTOMETER
Robert C. Richmond and Lawrence F. Marsch, Port Arthur, Tex., assignors to Texaco Inc., New York, N.Y., a corporation of Delaware
Continuation-in-part of application Ser. No. 417,020, Dec. 9, 1964. This application Aug. 4, 1967, Ser. No. 661,759
30 Claims. (Cl. 137—92)

ABSTRACT OF THE DISCLOSURE

An apparatus for continuously measuring the consistency of a stream of material comprising a resilient member located in the stream so that the two surfaces about which it is flexible are parallel to the direction of the flow of the material in the stream, having strain gauges mounted thereon to provide an indication of the consistency of the material by measuring the reaction forces exerted thereon by the material flowing thereby. Means are provided for rotating the resilient member at a constant rate relative to the stream about an axis which is parallel to the direction of flow of the stream. In accordance with another embodiment the resilient member is held stationary while means, such as a rotatable drum with internal vanes, are provided for rotating the stream of material at a constant rate about an axis parallel to the direction of flow.

CROSS REFERENCES TO RELATED APPLICATIONS

This application is a continuation-in-part of application Ser. No. 417,020, filed Dec. 9, 1964, now abandoned.

BACKGROUND OF THE INVENTION

(1) Field of the invention

This invention relates to an improved device for providing a more accurate continuous measurement of the consistency of a stream of material.

(2) Description of the prior art

The standard for measuring the consistency of a material is to determine the penetration of a specially adapted tool therein under controlled conditions. The tool is calibrated so that the depth of penetration is correlated with the consistency of the material. This method does not lend itself to automation, that is, a means of obtaining a continuous measurement of the consistency. One mechanization for providing a continuous measure of consistency depends on maintaining a constant flow rate of the material whose consistency is being measured. A probe is located in the flow path and is displaced by the force of the material thereon an amount which is correlated with the consistency of the material. The major disadvantage of this mechanization is the problem of maintaining a constant flow rate since the flow rate is affected by various factors such as consistency and viscosity of the material. A further mechanization for measuring the consistency of a material is to measure the reaction of the material on a member rotated in the material whose consistency is to be measured. The reaction of the material on the rotating member may be measured as a change in torque required to maintain a constant speed of rotation. However, the drive means for rotating the member in the material contains inherent bearing loading and packing loading. These loading effects, which are variable, give rise to torques which cannot be distinguished from the torques generated to overcome the reaction of the material in the rotating element and thus affect the accuracy of the consistency measurement.

SUMMARY OF THE INVENTION

The present invention overcomes the disadvantages of the prior art by providing a consistometer which is capable of producing a continuous measurement of the consistency of a material independently of the rate of flow of such material. The device also provides a measurement of consistency which is free of any friction loading effects caused by bearing or packing friction.

It is the main object of the present invention to provide a consistometer capable of producing a measurement of the consistency of a stream of material with increased sensitivity and greater accuracy than has been obtainable heretofore.

It is another object of the present invention to provide a consistometer capable of producing a continuous measurement of consistency independently of the flow rate of the material.

It is another object of the invention to provide a consistometer capable of measuring the consistency of a flowing material without introducing any errors because of friction effects introduced by bearings and packing glands.

It is a further object of the present invention to provide a consistometer for measuring the consistency of a stream of material which measurement can be utilized as a control function.

The improved consistometer was specifically designed for use in connection with a continuous grease process. It will be appreciated that the present invention is not limited to use with grease but is adaptable for use in any process for determining and maintaining the consistency of a material. In connection with the use of the invention in a continuous grease process, a continuous stream of the grease is pumped through a channel wherein the consistometer is located. The consistometer generates an electrical signal which is proportional to the consistency of the grease flowing therethrough. This electrical signal is utilized to control a valve means which introduces a corresponding amount of consistency changing material, in this particular case oil, to maintain a predetermined consistency of the final product.

Briefly the invention resides in apparatus for continuously measuring the consistency of a stream of material comprising a resilient member located in the stream so that the two surfaces about which said member is flexible are parallel to the direction of flow in said stream. Means are provided for rotating said member at a constant rate about an axis which is parallel to the direction of flow. Further means are provided for measuring the reaction forces exerted on said resilient member by said material during rotation. The measurement obtained thereby provides an indication of the consistency of the material.

In accordance with a further embodiment of the invention the resilient member is maintained in fixed position and means are provided for rotating the grease at a constant rate about an axis which is parallel to the direction of flow.

BRIEF DESCRIPTION OF THE DRAWING

The above mentioned and other features and objectives of this invention and the manner of attaining them will become more apparent and the invention itself will be best understood by reference to the following description of the invention taken in conjunction with the accompanying drawing wherein:

FIG. 1 is a longitudinal sectional view, partly schematic, of the consistometer showing a chamber containing the rotatable resilient member mounted for rotation therein.

FIG. 2 is an electrical schematic diagram showing the electrical bridge circuit and auxiliary electrical equipment for providing the electrical signal proportional to the flexure of the resilient member shown in FIG. 1. The diagram also shows schematically the valve means operated by the electrical signal.

FIG. 3 shows an alternative embodiment of the resilient member depicted in FIG. 1.

FIG. 4 shows a longitudinal cross sectional view of a further embodiment of the consistometer.

FIG. 5 shows a schematic flow diagram of a continuous grease unit utilizing the consistometer of this invention.

FIG. 10 shows a longitudinal cross-sectional view of an additional embodiment of the consistometer, wherein the resilient member is held stationary and the chamber is mounted for rotation by external drive means.

DESCRIPTION OF THE PREFERRED EMBODIMENTS

Figure 6:
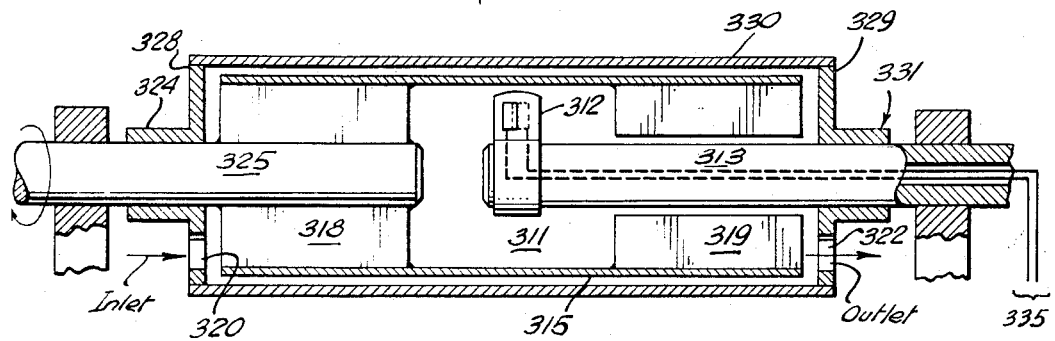
FIG. 6 is a longitudinal sectional view depicting another embodiment of the invention wherein the resilient member is held stationary and the chamber is mounted for rotation.

Referring to FIG. 1 there is shown a chamber 11 in which is mounted the resilient member 12. As mentioned previously, the present consistometer was designed specifically for use in a continuous grease process. In this connection, the chamber 11 is adapted for connection in a stream, usually a branch stream, through which the grease is continuously pumped. Accordingly, the inlet 13 is adapted to be connected to the upstream portion of the grease stream while the outlet 14 is adapted to be connected downstream to provide the continuing grease flow. The chamber 11, itself, has been specifically designed to provide a flow pattern of the viscous material around the resilient member 12 which will give rapid turnover of the grease and assure that fresh material is in contact with the flexible member at all times.

In this connection, inlet feed distribution means is provided which consist of holes 18 in an outwardly slanting input wall member 17 which are located in a circle having a predetermined radius and which is concentric with the longitudinal axis of the chamber 11. These holes deposit the input material into the area of the chamber 11 through which the resilient member 12 is continuously rotated. Also, the chamber has inwardly tapered walls 22 leading to the outlet 14. The specifically located holes 18, the outwardly slanting input walls 17 and the inwardly slanting wall structure 22 leading to the outlet 14 provides a desired flow pattern of the viscous material through the chamber such that the resilient member 12 when rotated is continuously engaging fresh material. The resilient member is shown in this embodiment as a flat flexible paddle or arm having its flat plane parallel to the stream of material. One end of the paddle is connected to a rotary drive head 24 located in the center of the chamber 11. The drive head 24 is connected to an end of a drive shaft 28 which is driven in rotation by a constant speed electric motor 29 through a speed reduction gear 31. The rotation of the paddle is at right angles to the stream flow and the rate of rotation is maintained constant so that the reaction of the material against the paddle will cause flexure of the paddle in its flat plane by an amount which is a function of the consistency of the material. Sealed bearings 32 are provided to minimize the friction between the rotating shaft 28 and the wall of the chamber through which the shaft passes. Packing means 34 in the form of a mechanical seal is provided about the shaft 28 where it enters the chamber to prevent any leakage of the grease along the drive shaft. The consistometer is operable with greases of heavy consistency since the packing means 34 as well as the bearings can be tight and of a heavy duty construction since the measurement of the consistency is not affected by the friction loading or torque applied to the drive shaft 28.

The flexible paddle 12 has a strain gauge member 38 mounted on one side thereof and a second strain gauge member 39 (not shown) mounted on the opposite side thereof. These gauges are adapted to measure the amount of flexure of the paddle as it is rotated through the material thereby giving an indication of the consistency of the material. The electrical leads 41 and 42 from the strain gauges 38 and 39, respectively, are shown passing through a sealed hollow portion of the drive shaft 28. These leads 41 and 42 are connected to a slip ring assembly 43, 44 which may be of any conventional slip ring design.

It will be appreciated that the detecting means used in the consistometer is not limited to the two strain gauges described. One strain gauge could be utilized or additional strain gauges could be located on the same flexible paddle or might be located on additional paddles. The electrical signals obtained by several strain gauges could be averaged to obtain a more accurate measurement of the consistency.

The strain gauges utilized are of the type where an electrical characteristic is variable in accordance with the strain applied thereto. Most resistance type strain gauges are suitable for this application, such as foil, wire and semi-conductor. It is, of course, possible to protect the gauges from most mechanical or chemical damage.

The strain gauges 38 and 39 are represented in the electrical circuitry of FIG. 2 by resistances 52 and 53, respectively. The resistors 52 and 53 are shown connected in a Wheatstone bridge circuit wherein they form the resistances of two legs of the bridge. The other two legs of the bridge are formed by fixed resistors 56, 57 and potentiometer 66. The bridge is energized by connecting the side nodal points of the bridge to a DC power supply 61. The output from the bridge is taken across the upper and lower nodal points by means of leads 62 and 63, respectively. The resistances of the various resistors of the bridge are selected such that the bridge network is balanced for the resistance value of the resistances 52 and 53 produced when the flexible paddle 12 is in its non-flexed condition. The potentiometer 66 is provided to aid in the initial balancing of the bridge network. It will be appreciated that any flexure of the resilient paddle 12 will cause a change in the resistance of the strain gauges 38 and 39 thereby giving rise to an unbalance in the bridge. Strain gauge 38 will produce an opposite resistance variation from strain gauge 39 which variation depends on which way the paddle is rotated. A clockwise rotation of the paddle shown in FIG. 1, that is rotation into the drawing, will produce compression in strain gauge 38 and tension in strain gauge 39 while a counter-clockwise rotation will produce the opposite strain. The unbalance caused thereby in the bridge gives rise to a current flow in the output which is proportional to the unbalance thereof. If additional strain gauges are utilized on the same flexible member or on additional flexible members they can be connected in series with the other strain gauges measuring the same value, i.e., the strain gauges measuring tension can be connected in one series circuit while those measuring compression can be connected in another series circuit. The outputs 62 and 63 from the upper and lower nodal points of the bridge, respectively, are connected to a range selector 71 which provides for the manual selection of the amount of resistance between the two electrical leads 62 and 63 and thus controls the range of the electrical signal obtained by the imbalance of the bridge circuit. The maximum expected voltage provided by the bridge circuit is in the range of two volts for semiconductor gauges, representing the greatest flexure of the flexible member. The range selector can reduce this value to the millivolt region. The resulting millivolt signal is fed to recorder-controller 72. The recorder-controller, as the name implies, contains apparatus for recording the signal thereby giving a permanent record or display of the variations of the consistency of the stream of material. The controller portion of recorder-controller 72 consists of a converting means for changing the electrical signal into a pneumatic signal. The recorder-controller may be any conventional apparatus for accomplishing the two functions such as, for example, the Bristol Dynamaster strip chart millivolt recorder with three mode pneumatic controller manufactured by The Bristol Company, Waterbury 20, Conn. The pneumatic signal is utilized to operate the diaphragm valve 73 to control the rate of addition of any material, such as oil, thereby controlling the quality of the final product in accordance with the measured consistency.

FIGURE 3 shows an alternative embodiment for the resilient paddle and strain gauge arrangement shown in FIG. 1. This arrangement consists of a cantilever beam 74 comprising a steel reed or any suitable reed member in which the change in strain gives rise to a sufficient displacement to be measurable by a strain gauge member. The cantilever beam 74 may consist of a long reed which is pivoted in the middle about a drive member 76 or it may consist of separate reeds extending from the drive member 76. The outer ends 75 of the reed or beam have a particular shape, in this case rectangular, to provide more surface area for reaction with the materials through which the cantilever beam is rotated. Strain gauges 77 and 78 are located along the cantilever beam, preferably near the point of maximum strain. As shown, the strain gauges are on the same side of the beam but on opposite radii, thus as the beam is rotated at right angles to the stream flow one strain gauge will measure tension while the other will measure compression. As was the case in the previously described arrangement in connection with FIG. 1, the strain gauges 77 and 78 form two legs in a bridge network which is utilized to detect the changes in the strain of the beams and accordingly the changes in consistency of the material providing the strain. It will be appreciated that more than one set of strain gauges can be utilized and more than one cantilever beam can be provided.

The embodiment of the invention depicted in FIGURE 4 is based on the same principle as the foregoing embodiments. The main advantage of the FIGURE 4 embodiment is the elimination of the chamber. This is made possible by a different orientation of the paddles or blades than is found in FIGURE 1. Here the blades 106, each of which contains a strain gauge 107, are mounted so as to extend parallel to the stream and their axis of rotation. Their flat plane is still parallel to the stream flow, however, the longitudinal dimension is no longer radial or cross-stream but is now parallel to the axis of rotation or the stream. Thus, the radial dimension of the unit has been minimized so that it can easily fit inside a small diameter pipe, i.e., a 1½ inch pipe shown as 109 on FIGURE 4. It will be appreciated that the blades or paddles would be operable for any position between the extremes described by the two embodiments, i.e., between the positions of the blades extending radially from the axis of rotation and extending parallel thereto. The blades 106 are connected to a rotatable head 105 which is rotated by a drive shaft 100. The drive shaft 100 has an opening 101 therethrough in which the leads (not shown) from the strain gauges 107 can be sealed to make an electrical connection externally thereof. Bearings 102 and packing gland 103 are provided along the shaft.

In operation the grease or material whose consistency is to be measured flows along the pipe 109 in the direction depicted by arrow 108. The blades are continuously rotated through the grease at a constant speed. The reaction of the grease on the blades causes deflection thereof along its flat or face plane. The reaction of the grease on this flat face of the blades 106 causes a deflection thereof which is measured by the strain gauges 107. It will be appreciated that the strain gauges provide opposite outputs as arranged in FIGURE 4 since one will measure tension and the other compression depending on which way the paddles are rotated. The grease after its consistency has been measured is shown passing through an outlet 104. The strain gauges form two legs of an electrical bridge network, the same as the strain gauge in FIGURE 1, to produce an electrical signal which provides an output that is indicative of the consistency of the material flowing through pipe 109.

The blades 106 can each contain a pair of strain gauges 107, one gauge located on each of the planar surfaces thereof which are parallel to the direction of flow. The strain gauges measuring tension during rotation through the stream of material can be connected together in series while the others measuring compression can also be connected in series. The series arrangement of tension measuring strain gauges can form the resistance in one leg of a bridge while the series arrangement of compression measuring gauges can form the resistance in another leg of the bridge. The bridge in such an arrangement would be exactly the same as was described in connection with FIGURE 2.

FIGURE 5 shows a simplified flow diagram of a continuous grease unit in which a consistometer is utilized to measure the consistency of the grease being produced and to perform a control function therein. The continuous grease process is set forth in detail in the copending U.S. patent application Ser. No. 333,164. Briefly, the continuous grease-making unit consists of fat, alkali and No. 1 oil charging facilities; a reactor section with a circulation pump 81; a vacuum flash chamber with circulating pump 82 and a finishing section containing circulating pump 83 and shear valve 84. Alkali and fat are pumped through the reactor circulating system by means of pumps 85 and 86, respectively, and the pressure in the reactor system is maintained constant by means of spring loaded valve 87. The vacuum on the flash chamber is maintained constant by means of diaphragm valve 88 discharging into a vacuum system. Pressure on the vacuum flash chamber circulating system is maintained at a pressure above atmospheric and shearing is maintained by means of spring loaded shear valve 89.

The pump-way from the vacuum flash chamber is handled by pump 91 under level control to maintain a constant level in the vacuum flash chamber. Additives and the No. 2 oil, which may be the same as the No. 1 oil or may be different, are pumped into the discharge of pump 91 and the total stream is circulated through spring loaded shear valve 84 by means of pump 83. The total product discharges through spring loaded valve 92 set to maintain constant pressure on the circulating system in the finishing section. A small portion of the product is pumped through the heat exchanger 93 and consistometer 94 by means of pump 95. The heat exchanger 93 maintains the grease entering the consistometer 94 at a constant temperature. The discharge from the consistometer joins the product on the downstream side of valve 92. Pump 95 will allow the grease to flow through the consistometer 94 at a nearly constant rate even though the pressure drop across valve 92 is applied across the pump 95, heat exchanger 93 and consistometer 94. The consistometer 94 shown within the dotted block in FIGURE 4 consists of the constant speed electric motor 29, slipring assembly 43, 44 and the consistometer chamber 11 containing the rotating sensing element. The electrical signal generated by the consistometer which is proportional to the consistency of the grease in the process is fed to recorder-controller 73 which as previously mentioned, converts the electrical signal into a proportional pneumatic variation to operate pneumatic diaphragm valve 73 thereby controlling the rate of addition of the No. 2 oil which is added to the grease to maintain the proper quality.

As previously mentioned, it is not necessary to provide the consistometer in a branch loop as is shown in FIGURE 5. The consistometer can be located in a convenient pipe carrying the main stream of material. This is most easily seen in connection with the embodiment shown in FIGURE 4, where the consistometer can be easily located in a relatively narrow pipe.

It will be appreciated that the consistometer of this invention is not limited to use in a continuous grease process but may be utilized to measure the consistency of practically any material such as polymers, asphalts, lubricating oils, gasolines, etc.

Figure 7:
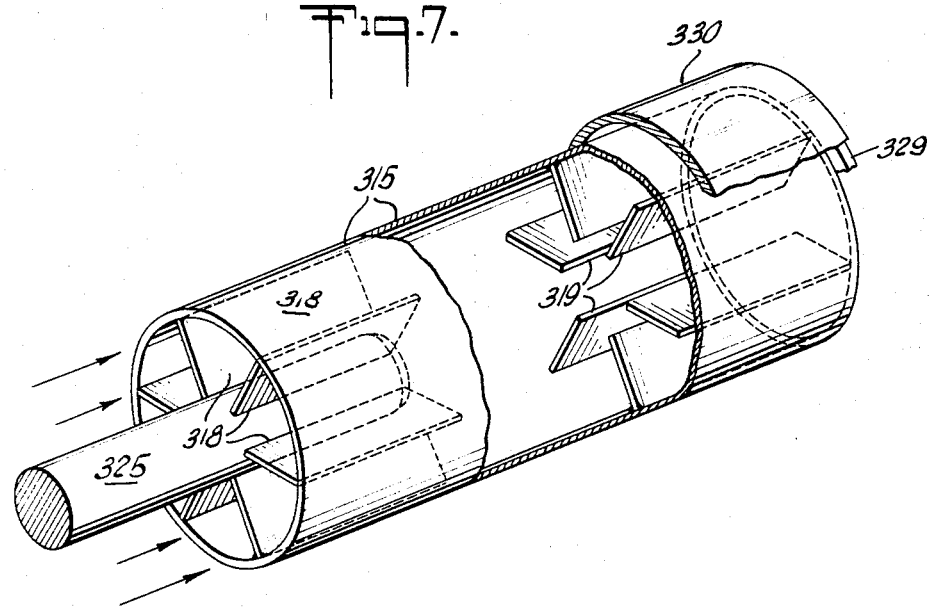
FIG. 7 is an isometric view of the vanes and rotor assembly of the apparatus of FIG. 6.

Referring to FIGS. 6 and 7 there is shown a chamber 311 enclosed within a cylindrical rotor assembly 315 in which a resilient member 312 is mounted on a stationary shaft 313. Attached to the inner periphery of the rotor assembly 315 and to a rotatable shaft 325 substantially concentric with the rotor assembly by welding or other means are inlet vanes 318. The inlet vanes 318 extend from the inlet end of the chamber 311 to a position spaced from resilient member 312. Spaced from the opposite side of resilient member 312 to the outlet end of the chamber 311 are outlet vanes 319 which are attached to the rotor assembly 315. Shaft 325 extends outside the chamber 311, to a rotating means capable of rotating the shaft about its axis at a constant speed. The rotating means may comprise a suitable electric motor and pulley or gear arrangement, the details of which are not part of this invention. The rotor assembly 315, inlet and outlet vanes 318 and 319, respectively, and resilient member 312 are all enclosed in an outer stationary casing 330. The outer casing 330 has an inlet port 320 on the side adjacent the inlet vanes 318 and an outlet port 322 on the side adjacent the outlet vanes 319. The inlet wall 328 of outer casing 330 forms into a hub or packing gland 324 on its inlet side through which means lie between the hub 324 and the rotatable shaft 325 permitting the stationary casing to rest on the rotatable shaft. The outer casing outlet wall 329 forms a support or packing gland 331 which bears upon stationary shaft 313 for support.

In operation when the consistency of grease or other fluid substances are being measured, the grease is introduced into inlet 320 and forced by the continuing supply of grease entering the inlet into the spaces between inlet vanes 318 where a rotational motion is imparted to the grease. As the rotating grease is forced past the inlet vanes it flows by the stationary resilient member 312. The resistance to rotational motion between the grease and the resilient member 312 deflects the resilient member. Strain gauges attached to both sides of the resilient member 312 measure the amount of deflection by generating a signal proportional to the deflection. This signal is conducted through leads 335 which are located in a hollow central portion of the stationary shaft 313. The leads extend from the exterior end of the stationary shaft 313 to a Wheatstone bridge where the consistency of the material passing through the chamber 311 is indicated.

As new grease is continually forced into the inlet the grease in the chamber is, in turn, forced through the outlet vanes 319 which maintain a constant rotational movement of the grease, which then flows through outlet 322. In accordance with a further embodiment, it is contemplated that the outlet vanes 319 may be omitted.

Figure 8:
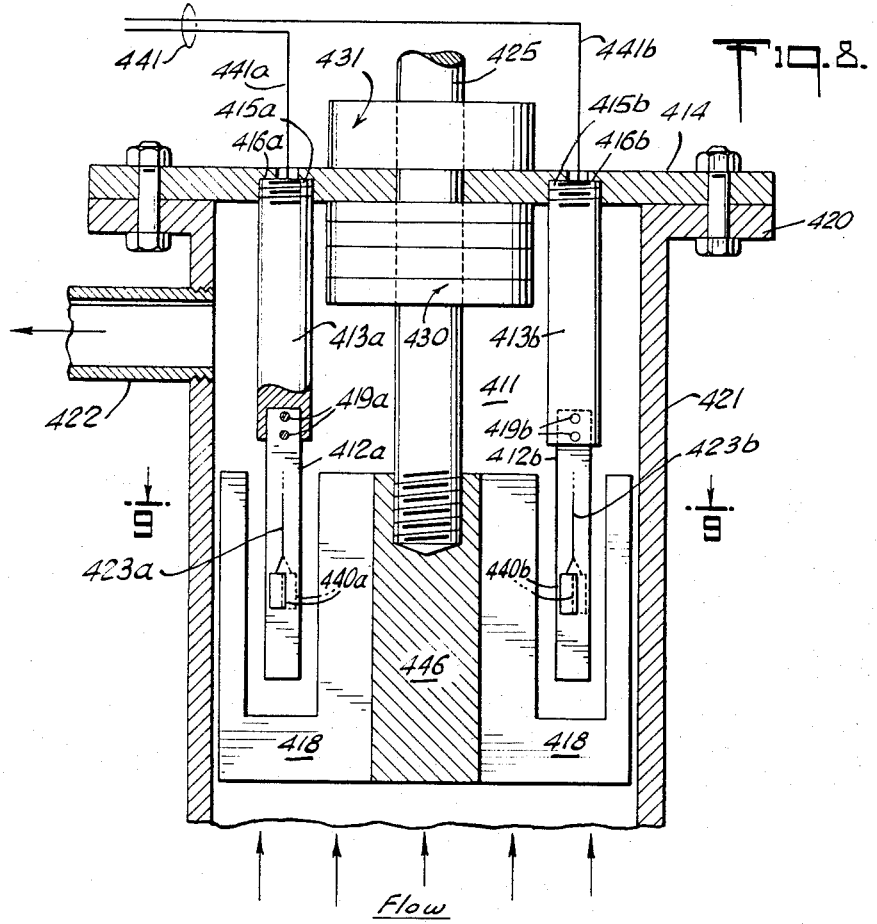
FIG. 8 shows a longitudinal cross-sectional view of a further embodiment of the consistometer wherein the resilient member is held stationary and the chamber is mounted for rotation.
Figure 9:
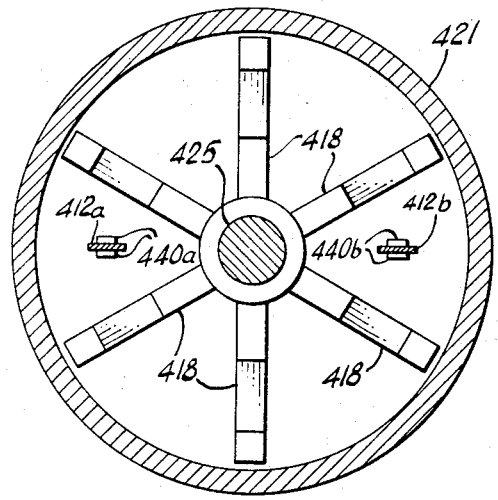
FIG. 9 is an end view of the apparatus of FIG. 8, taken along the lines 9—9 of FIG. 8

A further embodiment effecting relative rotational movement between the grease and the resilient member rotating the grease about stationary resilient member is shown in FIGS. 8 and 9. The consistency measurement is made in a cylindrical chamber 411, within a sleeve member 421 which is open at its bottom end to receive grease. The sleeve member 421 is desirably in the form of a cylinder and is attached by means (not shown) to a source of grease or other fluid to be measured. The top of the sleeve member 421 has a flange 420 which is bolted to a cover plate 414. The cover plate 414 has a central opening to receive a drive shaft 425 through a bearing 431 and a shaft seal 430. The bearing 431 being located adjacent the face of cover plate 414 outside chamber 411 and the shaft seal 430 being located adjacent the inner face of cover plate 414 are shown for illustrative purposes only. Cover plate 414 preferably has two tapped holes 416a and 416b in its chamber face where threaded end portions 415a and 415b respectively, of cylindrical support rods 413a and 413b respectively, are each fitted into a slot therein and held by rivets 419a and 419b respectively or by other means. On either flat face of the resilient members 412a and 412b a strain gauge 440a and 440b respectively is attached thereon. Leads 423d and 423b from the strain gauge elements 440a and 440b respectively extend through a channel in support rods 413a and 413b respectively and in cover plate 414 so that the leads 423a and 423b are brought together respectively in bundles 441a and 441b which are in turn coupled together in bundle or harness 441. Harness 441 extends to a Wheatstone bridge where the leads therein form resistances of two legs of the bridge. The bottom section of the drive shaft 425 is threaded to mate with a tapped hole in the hub 446 of an assembly having vanes 418. The vanes 418 are U-shaped to permit passage of the vanes past the resilient members 412a and 412b without mechanical interference. As the vanes turn, rotating the grease flowing therein, they pass by the resilient members 412a and 412b causing a relative rotational movement between the grease and the resilient member. An outlet passage 422 is formed in sleeve assembly 421 between the extremities of the support rods 413a and 413b. The grease thus passing resilient members 412a and 412b are forced out of chamber 411 through the outlet 422.

A further embodiment of the invention, which is a modification of the embodiment depicted in FIGS. 6 and 7, is depicted in FIG. 10 wherein inlet and outlet vanes are attached at their outer edge to a rotating cylinder and the resilient member is held stationary within the cylindrical chamber. In the apparatus of FIG. 10 a resilient member 512 is positioned in a chamber 511 within a rotatable cylindrical housing 513 and positioned between inlet vanes 518 and outlet vanes 519. The external edges of the inlet vanes 518 and the outlet vanes 519 are attached to the inner periphery of the cylindrical casing 513. A ring gear 520 is attached by welding or other means to the outer periphery of the cylindrical casing 513. A pinion 521 is disposed in meshing relationship with the ring gear 520 and is driven by a constant speed drive means, the details of which are not part of this invention. The pinion 521 and ring gear 520 rotate the cylindrical housing 513 substantially about its axis as well as the inlet and outlet vanes attached thereto. In accordance with another embodiment, it is contemplated that the outlet vanes 519 may be omitted.

The resilient member 512 is shown as a two bladed member, however, the member 512 may comprise a different number of blades. Strain gauges 525 are attached to either or both sides of each blade, both sides being shown in FIG. 10, back to back with the strain being displaced for illustrative purposes only. The leads 563a from the strain gauges 525 represent two leads from each strain gauge. These leads are joined in a harness 563b which fits in the hollow core of hollow support shaft 526.

Inlet T 531 fits over the outer end of the support shaft 526 and has an inlet opening 532 where grease enters the apparatus. Entry ports 535 in the support shaft 526 communicate with the inlet opening 532 so that the grease is forced therethrough into chamber 511 where inlet vanes 518 rotate the grease. An inlet cap 536a having a circular opening for the support shaft 526 to fit therein is bolted to the cylindrical housing 513 on the side adjacent the inlet vanes. An inlet seal, shown as packing gland 540a, is fitted about the hollow shaft 526 adjacent the internal side of the inlet cap 536a. This seal prevents grease from leaking out of the chamber 511 and it is to be understood that multiple packing glands may be employed, as desired.

The external side of the inlet cap 536a has a recess housing; support bearings 544a are fitted over the hollow support shaft 526. A threaded bearing retainer 550a fits over shaft 526 and is screwed onto the thin shelled cylindrical inlet wall 545a of inlet cap 536a to secure the support bearing 544a.

Similarly, an outlet cap 536b having a circular opening for a hollow outlet shaft 541 which receives the grease after it leaves the resilient member and deposits it outside chamber 511, is bolted to the opposite side of the cylindrical housing 513. An outlet seal, shown as packing gland 540b, is fitted about the hollow outlet shaft 541 adjacent the internal side of the outlet cap 536b. Support bearings 544b fit in a recess on the external side of the outlet cap 536b over the outlet shaft 541. An outlet bearing retainer 550b fits over the outlet shaft 541 and screws onto thin shelled cylindrical outlet wall 545b of outlet cap 536b to secure the support bearings 544b.

The neck of a seal support 560 fits into the inlet T 531 opening opposite the hollow shaft 526 opening. The seal support 560 has a central opening therethrough which is bevelled at its outer portion, for the strain gauge harness 563b to fit therein. The outer portion of seal support 560 forms a head which is externally threaded. A seal 561 having its front portion bevelled so that it fits tightly into the seal support 560 has a central opening for the harness 563b and their waterproof sleeve 564. The seal 561 is fabricated from resilient material such as rubber, soapstone, etc. A cap nut 562, having a central opening for the harness 563b and sleeve 564 to pass therethrough, bears tightly against the seal 561 forcing it into the seal support 560. The cap nut 562 has internal threads which mate with external threads on the head of the seal support 560.

The strain gauge electrical leads 563a extend from the resilient member 512 through hollow support shaft 526, inlet T 531, seal support 560, seal 561 and cap nut 562 to Wheatstone bridge circuits (not shown) wherein they form the resistances of two legs of the bridge.

The instrument is sustained on inlet support 530a and outlet support 530b which respectively are connected to hollow support shaft 526 and outlet shaft 541.

It is to be understood that each strain gauge of the member 512 is provided with a pair of electrical leads. Thus, the four strain gauges 525 attached to the member 512 are provided with a total of four pairs of electrical leads, all of which are assembled in the bundle or harness 563b, from whence they are connected to appropriate bridge circuits (not shown), in the manner described above with respect to the apparatus shown in the preceding figures of the drawing.

It is to be understood that various embodiments of the invention hereinabove described involve the provision of means for providing relative rotational movement between a stream of material, for example a grease, whose consistency is to be measured, and a flexible resilient member mounted in the stream of material so that the opposite surfaces about which the member is flexible are substantially parallel to the direction of the nonrotational, i.e. linear, flow of the material in the stream. By way of further explanation, whether the resilient member rotates relative to the flowing stream of material (FIG. 1, for example) or whether the material of the stream rotates relative to a fixed resilient member (FIG. 6, for example), in both cases the opposite surfaces about which said member is flexible are substantially parallel to the linear direction of flow of the stream. The foregoing apparatus together with means for sensing the condition of flexure of the resilient member, provides a measurement of the reaction forces exerted on the resilient member substantially entirely in a direction normal to the direction of flow of the material in the stream as it passes the flexible member, thereby indicating the consistency of the material substantially independently of the rate of linear flow of the material. Thus, the foregoing apparatus is suited to continuous measurement of the consistency of material flowing in a stream and is useful to provide a continuous consistency signal for controlling process parameters which, in turn, determine the consistency of the material being measured.

It will be appreciated that certain advantages are provided by various embodiments of the invention herein described. By way of example, the embodiments wherein the resilient member is rotated in the stream of flowing material requires less power to operate than the embodiments wherein the cylindrical conduit is rotated in order to rotate the stream of material relative to a fixed resilient member. On the other hand, the latter embodiments, employing a fixed resilient member, offer the advantage that they do not require the use of slip ring type electrical connections to couple the sensing means such as strain gauges attached to the resilient member to external electrical circuitry for measuring the condition of flexure of the resilient member.

Obviously, many modifications and variations of the invention as hereinabove set forth, may be made without departing from the spirit and scope thereof, and therefore, only such limitations should be imposed as are indicated in the appended claims.

We claim:

1. Apparatus for continually measuring the consistency of a stream of material comprising a rotatable resilient member located in said stream so that the opposite surfaces about which said member is flexible are substantially parallel to the direction of flow in said stream, means for rotating said member at a constant rate about an axis which is parallel to the direction of flow in said stream, means for sensing the condition of flexure of said member in order to provide a measurement of the reaction forces exerted on said resilient member substantially entirely in a direction normal to said direction of flow by said material during rotation therethrough, said measurement indicating the consistency of the material substantially independently of the rate of flow of said material.

2. Apparatus in accordance with claim 1, wherein said means for measuring the reaction forces comprises a pair of strain gauges one mounted on either of said opposite surfaces of said flexible member, and an electrical circuit, said pair of strain gauges forming part of said circuit.

3. Apparatus for continually measuring the consistency of a stream of material comprising a pair of rotatable resilient members located in said stream so that the opposite surfaces about which each of said members is flexible are substantially parallel to the direction of flow in said stream, means for rotating each of said resilient members at a constant rate about a common axis which is parallel to the direction of flow in said stream, means for sensing the condition of flexure of said members comprising a pair of strain gauges one gauge mounted on each flexible member but on opposite surfaces thereof so that one of said strain gauges measures compression while the other measures tension, and an electrical circuit, said pair of strain gauges forming part of said circuit.

4. Apparatus for continually measuring the consistency of a stream of material comprising a pair of rotatable resilient members located in said stream so that the opposite surfaces about which each of said members is flexible are substantially parallel to the direction of flow in said stream, means for rotating each of said resilient members at a constant rate about a common axis which is parallel to the direction of flow in said stream, means for sensing the condition of flexure of said members comprising two pairs of strain gauges, the gauges of each pair being located on either side of a respective one of said pair of resilient members, one strain gauge of each pair measuring tension and the other measuring compression, and an electrical circuit, said pairs of strain gauges forming part of said circuit.

5. Apparatus in accordance with claim 1, wherein said resilient member is a cantilever beam connected at its center to said means for rotating, and said measuring means comprises a first and second electric strain gauge mounted on the same side of said cantilever beam but on opposite sides of said means for rotating.

6. Apparatus in accordance with claim 1, wherein said resilient member is a thin, flat, flexible paddle, said paddle presenting its thin edge to the flowing stream.

7. Apparatus for continually measuring the consistency of a stream of material comprising a rotatable resilient member located in said stream so that the two surfaces about which said member is flexible are substantially parallel to the direction of flow in said stream, means for rotating said resilient member at a constant rate about an axis which is parallel to the direction of flow in said stream, electrical circuit means, means for sensing the condition of flexure of said members comprising electrical strain gauge means mounted on said resilient member so as to change the resistance characteristic of said strain gauge means in response to any flexing of said resilient member caused by the reaction forces exerted on said resilient member by rotation of said member in said material, said electrical strain gauge means forming part of said electrical circuit and changing the electrical characteristics of said circuit in accordance with the change in resistance characteristic of said strain gauge means, thereby producing an electrical signal indicative of the consistency of the material in said stream.

8. Apparatus according to claim 7, wherein said electrical circuit means comprises a bridge circuit, said electrical strain gauge means forming a resistance in said bridge circuit.

9. Apparatus for continually measuring the consistency of a stream of material comprising a chamber adapted to be connected in said stream of viscous material so that at least some of said stream of material continuously passes therethrough, a pair of resilient members mounted within said chamber for rotation at right angles to the stream of material, means for rotating said resilient members at a constant rate about an axis which extends parallel to said stream of material flowing through said chamber, said resilient members extending radially from the axis of rotation, electrical circuit means, means for sensing the condition of flexure of said members comprising electrical strain gauge means mounted on said resilient members so as to change the electrical characteristics of said strain gauge means in accordance with any flexing of said resilient members caused by rotation of said members in said material, said electrical strain gauge means forming part of said electrical circuit and changing the electrical characteristics of said electrical circuit in accordance with the change in the electrical characteristics of said strain gauge means thereby producing an electrical signal indicative of the reaction forces exerted on said resilient member during rotation therethrough substantially entirely in a direction normal to the direction of flow of said stream of material, in order to provide a measurement of consistency of the material in said stream substantially independently of the rate of flow of said material.

10. Apparatus for continually measuring the consistency of a stream of material comprising a rotating shaft extending into said stream parallel to the direction of flow thereof, a pair of resilient members attached to said shaft and extending parallel thereto into said stream of material, said flexible members presenting their thin edge to the flowing stream, electrical circuit means, means for sensing the condition of flexure of said members comprising electrical strain gauge means mounted on said resilient members so as to change the electrical characteristics of said strain gauge means in accordance with any flexing of said resilient members caused by rotation of said members in said material, said electrical strain gauge means forming part of said electrical circuit and changing the electrical characteristics of said electrical circuit in accordance with the change in electrical characteristics of said strain gauge means thereby producing an electrical signal indicative of the consistency of the material in said stream.

11. A consistency regulating system comprising a conduit, pump means for passing a continuous stream of material to be regulated through said conduit, a rotatable resilient member located in said stream within said conduit so that the opposite surfaces about which said member is flexible are substantially parallel to the direction of flow in said conduit, means for rotating said resilient member at a constant rate about an axis which is coaxial with the longitudinal axis of said conduit, means for developing a signal proportional to the forces exerted on said resilient member by said material in a direction substantially normal to the direction of flow of said stream due to rotation of said member through said material, said signal developing means including means for sensing the condition of flexure of said member, valve means for introducing consistency changing materials to said stream of material to change the consistency thereof and means responsive to said signal for controlling said valve means.

12. In apparatus for performing a continuous process in the manufacturing of grease, a conduit adjacent the output of said apparatus, means for pumping the grease being processed through said conduit, a viscosimeter coupled to said conduit, said viscosimeter having an output for providing an electric output signal indicative of the viscosity of said grease in said conduit, a temperature exchanger for maintaining the temperature of the grease passing through said conduit constant, valve means controlling the passage of consistency controlling additives to the output of said continuous grease process apparatus, pneumatic means coupled to said output of said viscosimeter and responsive to said electric output signal from said viscosimeter for controlling said valve means thereby regulating the consistency of grease manufactured by said continuous grease process, the improvement wherein said viscosimeter comprises a resilient member mounted for rotation within said conduit, means for rotating said resilient member at a constant rate at right angles to the direction of flow of said grease in said conduit, electrical circuit means, electrical strain gauge means mounted on said resilient member so as to change the resistance characteristics of said strain gauge means in response to flexing of said resilient member caused by reaction of said material thereon during rotation, said electrical strain gauge means forming part of said electrical circuit and changing the electrical characteristics of said circuit in accordance with the change in resistance characteristic of said strain gauge means, thereby producing an electrical output signal indicative of the consistency of the grease passing through said conduit.

13. Apparatus in accordance with claim 1, wherein said means for measuring the reaction forces exerted on said resilient member comprises means for measuring the amount of flexure of said resilient member.

14. Apparatus in accordance with claim 13, wherein said means for measuring the amount of flexure of said resilient member comprises a strain gauge.

15. Apparatus for continually measuring the consistency of a stream of material comprising a flexible resilient member located in said stream and disposed so that the opposite surfaces about which said member is flexible are substantially parallel to the direction of flow of said material in said stream, means for causing rotational movement between said material and said member at a constant rate about an axis which is parallel to the direction of flow of said material in said stream, means for sensing the condition of flexure of said member in order to provide a measurement of the reaction forces exerted on said resilient member substantially entirely in a direction normal to said direction of flow by said material during said rotational movement as said material passes said member, said measurement indicating the consistency of the material substantially independently of the rate of flow of said material.

16. Apparatus in accordance with claim 15, wherein said means for measuring the reaction forces comprises a strain gauge mounted on said flexible member, and an electrical circuit, said strain gauge forming part of said circuit.

17. Apparatus in accordance with claim 15, wherein said resilient member is a thin, flat, flexible paddle, said paddle presenting its thin edge to the flowing stream.

18. Apparatus for continually measuring the consistency of a stream of material comprising a resilient member located in said stream so that the two surfaces about which said member is flexible are substantially parallel to the direction of flow in said stream, means for causing rotational movement between said material and said resilient member at a constant rate about an axis which is parallel to the direction of flow in said stream, electrical circuit means, means for sensing the condition of flexure of said member comprising electrical strain gauge means mounted on said resilient member so as to change the resistance characteristic of said strain gauge means in response to any flexing of said resilient member caused by the reaction forces exerted on said resilient member by said material, said electrical strain gauge means forming part of said electrical circuit and changing the electrical characteristics of said circuit in accordance with the change in resistance characteristics of said strain gauge means, thereby producing an electrical signal indicative of the consistency of the material in said stream.

19. Apparatus according to claim 18, wherein said electrical circuit means comprises a bridge circuit, said electrical strain gauge means forming a resistance in said bridge circuit.

20. Apparatus for continually measuring the consistency of a stream of material comprising a chamber adapted to be connected in said stream of viscous material so that at least some of said stream of material continuously passes therethrough, a pair of resilient members mounted within said chamber at right angles to the stream of material, means for causing rotational movement between said material and said resilient members at a constant rate about an axis which extends parallel to said stream of material flowing through said chamber, said resilient members extending radially from the axis of rotation, electrical circuit means, means for sensing the condition of flexure of said members comprising electrical strain gauge means mounted on said resilient members so as to change the electrical characteristics of said strain gauge means in accordance with any flexing of said resilient members caused by said rotational movement between said members and said material, said electrical strain gauge means forming part of said electrical circuit and changing the electrical characteristics of said electrical circuit in accordance with the change in the electrical characteristics of said strain gauge means thereby producing an electrical signal indicative of the reaction forces exerted on said resilient member by said material substantially entirely in a direction normal to the direction of flow of said stream of material, in order to provide a measurement of consistency of the material in said stream substantially independently of the rate of flow of said material.

21. A consistency regulating system comprising a conduit, pump means for passing a continuous stream of material to be regulated through said conduit, a resilient member located in said stream within said conduit so that the opposite surfaces about which said member is flexible are substantially parallel to the direction of flow in said conduit, means for causing rotational movement between said material and said resilient member at a constant rate about an axis which is coaxial with the longitudinal axis of said conduit, means for developing a signal proportional to the forces exerted on said resilient member by said material in a direction substantially normal to the direction of flow of said stream due to said rotational movement between said member and said material, said signal developing means including means for sensing the condition of flexure of said member, valve means for introducing consistency changing materials to said stream of material to change the consistency thereof and means responsive to said signal for controlling said valve means.

22. In apparatus for performing a continuous process in the manufacturing of grease, a conduit adjacent the output of said apparatus, means for pumping the grease being processed through said conduit, a viscosimeter coupled to said conduit, said viscosimeter having an output for providing an electric output signal indicative of the viscosity of said grease in said conduit, a temperature exchanger for maintaining the temperature of the grease passing through said conduit constant, valve means controlling the passage of consistency controlling additives to the output of said continuous grease process apparatus, pneumatic means coupled to said output of said viscosimeter and responsive to said electric output signal from said viscosimeter for controlling said valve means thereby regulating the consistency of grease manufactured by said continuous grease process, the improvement wherein said viscosimeter comprises a resilient member mounted within said conduit, means for causing rotational movement between said material and said resilient member at a constant rate at right angles to the direction of flow of said grease in said conduit, electrical circuit means, electrical strain gauge means mounted on said resilient member so as to change the resistance characteristics of said strain gauge means in response to flexing of said resilient member caued by reaction of said material thereon during said rotational movement, said electrical strain gauge means forming part of said electrical circuit and changing the electrical characteristics of said circuit in accordance with the change in resistance characteristic of said strain gauge means, thereby producing an electrical output signal indicative of the consistency of the grease passing through said conduit.

23. Apparatus in accordance with claim 15, wherein said means for causing said rotational movement includes rotatable conduit means for rotating said material in said stream.

24. Apparatus as defined in claim 23, wherein said rotatable conduit means comprises a cylindrical conduit having an inlet end for receiving said stream of material and an outlet end for discharging said stream of material, wherein a plurality of vanes are provided within said conduit and mounted for rotation therewith, said vanes being positioned upstream of the resilient member and disposed substantially in respective radial planes of said cylindrical conduit, wherein means are provided for rotating said cylindrical conduit substantially about its central axis at a constant rotational speed and wherein said flexible resilient member is mounted in a stationary position adjacent the downstream end of said vanes.

25. Apparatus as defined in claim 24 further comprising a plurality of additional vanes provided within said cylindrical conduit and mounted for rotation therewith and disposed substantially in respective radial planes of said cylindrical conduit and wherein said resilient member is positioned in said stream at a location intermediate said first-mentioned vanes and said additional vanes.

26. Apparatus as defined in claim 24 further comprising an additional casing defining a chamber surrounding said rotatable cylindrical conduit.

27. Apparatus as defined in claim 24 further comprising a central inlet conduit for introducing said stream of material into said rotatable cylindrical conduit, wherein said rotatable cylindrical conduit is mounted to said central inlet conduit by means including a fluid tight seal, and wherein means are provided for rotating said rotatable cylindrical conduit about said central inlet conduit.

28. Apparatus as defined in claim 27 wherein said means for rotating said rotatable conduit comprises a ing and pinion gear means driving said rotatable conduit.

29. Apparatus as defined in claim 27 wherein said resilient member is mounted to a centrally disposed shaft member, whereby said resilient member extends radially outward from said shaft within said rotatable conduit, and wherein said means for measuring the condition of flexure of said resilient member comprises electrical strain gauge means mounted to resilient member and electrical conductor means within said shaft for coupling said strain gauge means to an external electrical circuit comprising means for measuring an electrical characteristic of said strain gauge means.

30. Apparatus as defined in claim 15 wherein said means for causing said rotational movement includes rotatable vane means for rotating said material in said stream, said vane means comprising a plurality of vanes mounted for rotation about said axis parallel to the direction of flow of said stream of material and disposed substantially in respective radial planes extending outwardly of said axis, and wherein said flexible resilient member is mounted in a stationary position adjacent the downstream end of said vanes.

References Cited

UNITED STATES PATENTS

| | | |
|---|---|---|
| 2,703,493 | 3/1955 | De Boisblanc. |
| 3,071,962 | 1/1963 | Perkins. |
| 3,147,612 | 9/1964 | Evans. |

DAVID SCHONBERG, *Primary Examiner*.